Patented July 5, 1932

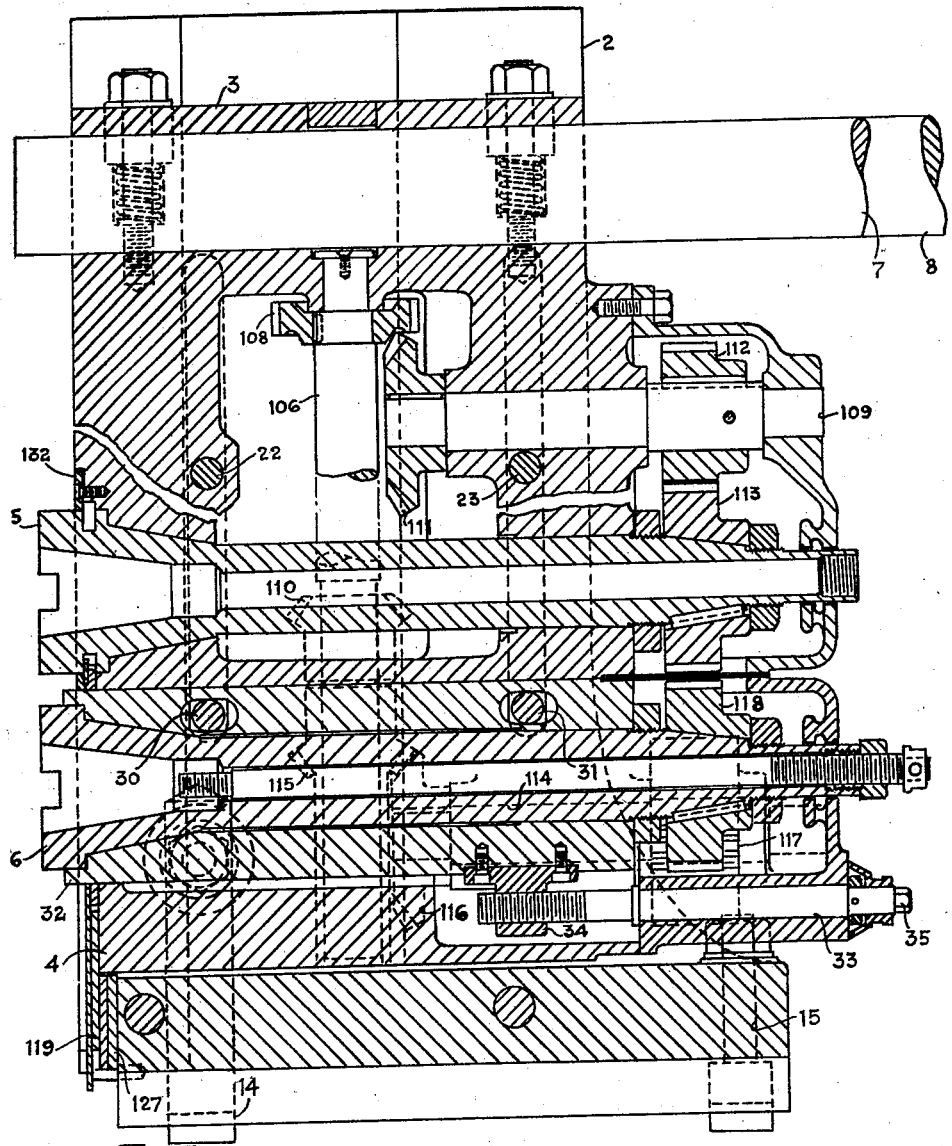

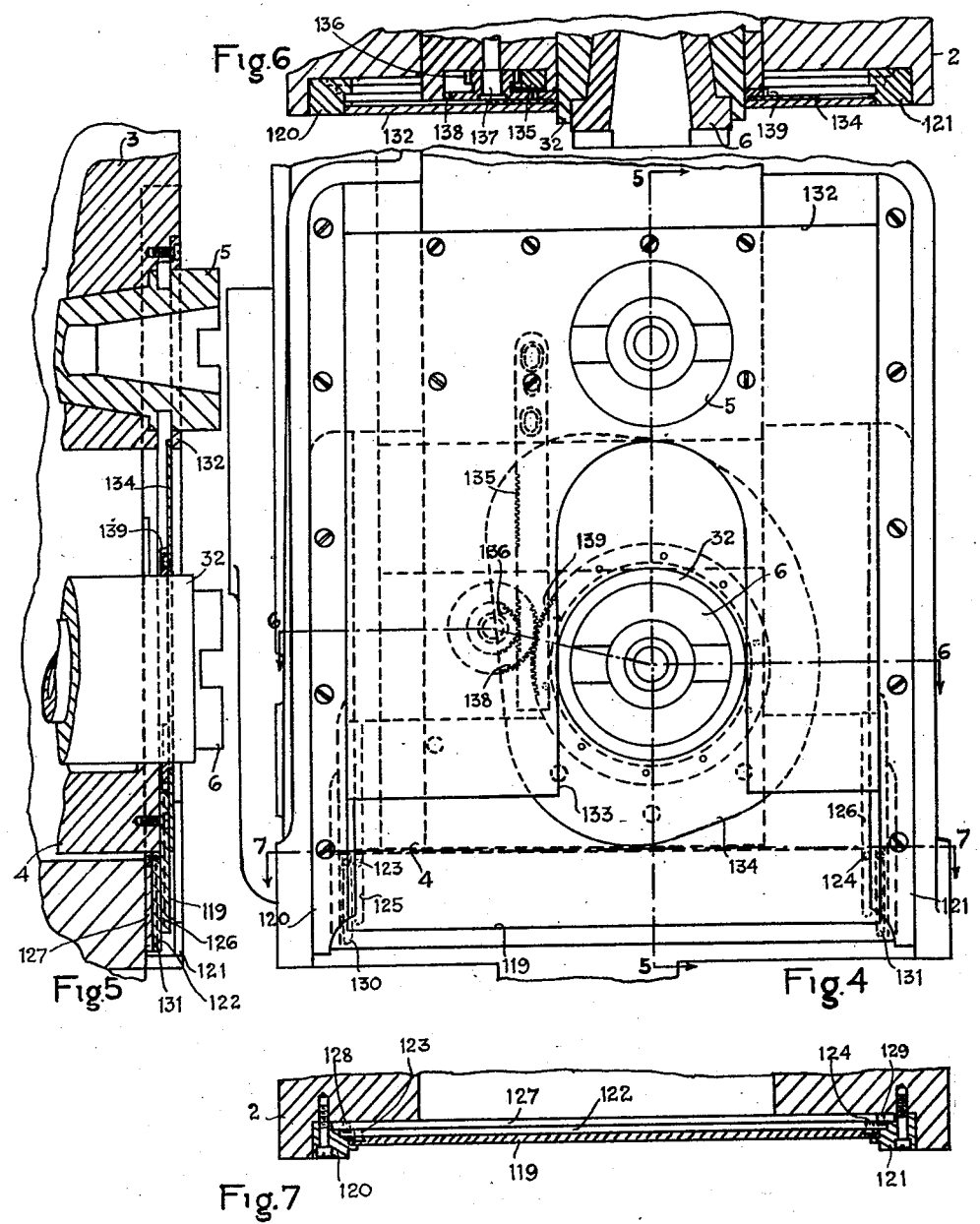

1,866,259

UNITED STATES PATENT OFFICE

EDWARD J. KEARNEY, OF WAUWATOSA, WISCONSIN, ASSIGNOR TO KEARNEY & TRECKER CORPORATION, OF WEST ALLIS, WISCONSIN

MACHINE TOOL

Application filed July 8, 1931. Serial No. 549,447.

This invention relates to machine tools and more particularly to milling machines.

An object of the invention is to provide improved means for protecting the mechanism from chips and other foreign materials.

A further object is to provide improved means for supporting and driving a plurality of spindles in such a machine.

A further object is to provide improved adjustment relationships between said spindles.

A further object is to provide improved relations between said spindles and the protecting means.

A further object is to improve the construction and operation of milling machines and machine tools generally and further objects and advantages will be apparent from the specification.

The invention consists in the construction and combination of parts as herein illustrated, described, and claimed and in such modification of the structure illustrated and described as may be equivalent to the claims.

Like reference characters refer to the same parts throughout the specification and drawings in which:

Fig. 3 is a sectional development on the line 3—3 of Fig. 2.

Fig. 4 is a view similar to Fig 2, but showing more particularly certain closure members.

Fig. 5 is a partial section on the line 5—5 of Fig. 4.

Fig. 6 is a similar view on the line 6—6 of Fig. 4.

Fig. 7 is a similar view on the line 7—7 of Fig. 4.

Fig. 8 is a development partially on the line 8—8 of Fig. 1.

Fig. 9 is a sectional view on the line 9—9 of Fig. 1.

Figure 1:
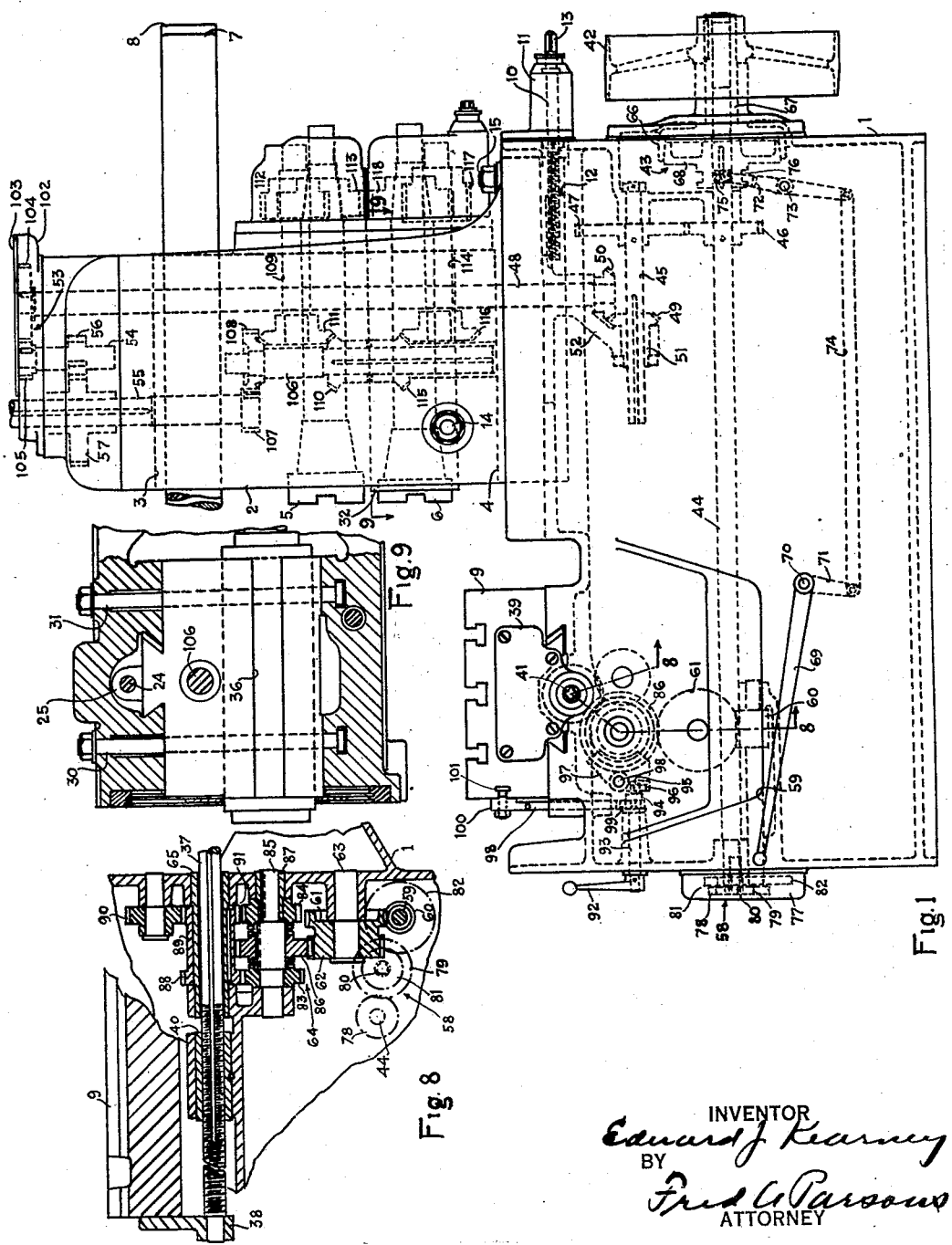
Fig. 1 is a right side elevation of a milling machine embodying the invention.

The machine illustrated comprises a bed 1 having a head frame 2, Fig. 1, mounted thereon for adjustment in one directon, the head frame supportng a plurality of spindle carriers generally denoted by numerals 3 and 4. The spindle carriers are vertically adjustable in the head frame and have rotatively mounted therein a plurality of tool spindles 5 and 6 respectively. A plurality of overarms 7 and 8 are slidably fitted in spindle carrier 3 for purposes well understood in this art. A work table 9 is supported from bed 1 and arranged to receiprocate in a path at right angles to the axes of the spindles and also at right angles to the path of adjustment of head frame 2.

Means are provided for adjusting the head frame in the form of a screw 10 journaled in a suitable bearing 11 fixed with bed 1, the screw engaging a nut 12 fixed with the head frame whereby rotation of the screw by means of a crank, or the like, not shown, applied to a squared portion 13 causes translation of head frame 2 in one or the other direction along its adjustment path. Suitable means are provided for clamping the head frame in a desired adjusted position indicated as bolts 14 and 15. The details of these means forming no part of the present invention, it is deemed unnecessary to describe them further.

Figure 2:
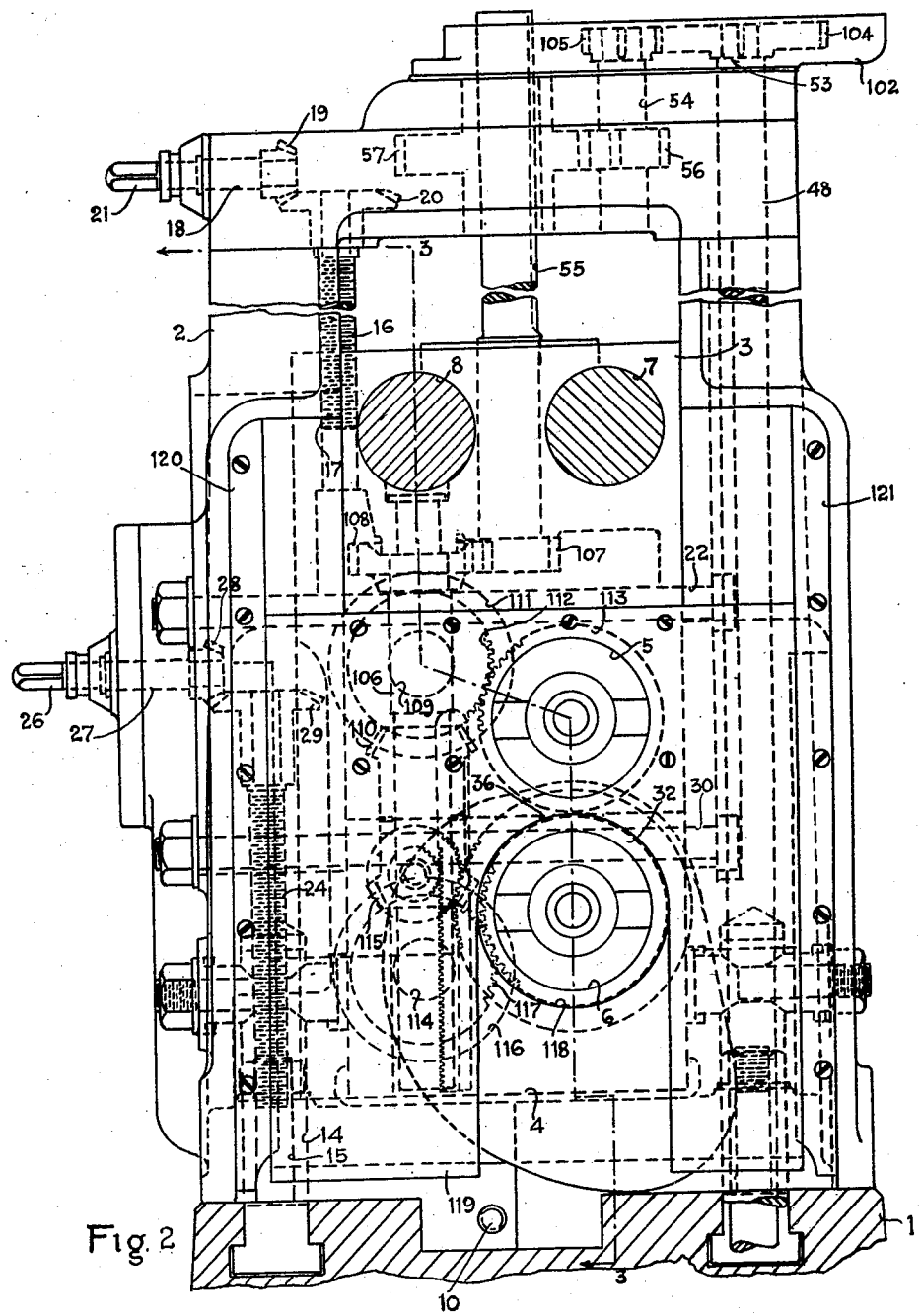
Fig. 2 is a front elevation of a portion of the machine.

Spindle carrier 3 may be vertically adjusted by means of a screw 16, Fig. 2, journaled in a suitable bearing in head frame 2 and engaging a nut 17 fixed with the spindle carrier. Screw 16 may be rotated from a shaft 18 journaled in head frame 2 and driving the screw through bevel gears 19 and 20 fixed respectively with the shaft and screw. A squared portion 21 is formed on the shaft for reception of a crank; or the like, for rotating. After adjustment the spindle carrier may be clamped in position by means of bolts 22—23 arranged to deflect the sides of the head frame sufficiently to grip the spindle carrier in a manner which is common in machines of this type.

In a similar manner spindle carrier 4 may be vertically adjusted by means of a screw 24 restrained against axial movement by means of a suitable bearing in head frame 2 and engaging a nut 25, Fig. 9, fixed with the carrier. Screw 24 may be rotated by means of a crank, or the like, not shown, applied to the squared portion 26 of a shaft 27 journaled in head frame 2 and driving screw 24 through bevel gears 28 and 29 meshed together and fixed respectively with the shaft and screw. After adjustment carrier 4 may be clamped in position by means of bolts 30—31, Figs. 2 and 9, arranged to deflect the sides of the head frame sufficiently to grip the carrier as above described.

Spindle 5 is mounted for rotation in carrier 3 in bearings of any suitable or well-known type, while spindle 6 is rotatively supported in a sleeve 32 which is slidably mounted in a suitable bore in carrier 4, see Fig. 3. Sleeve 32 with spindle 6 therein may be longitudinally adjusted by means of a screw 33 journaled in a part of carrier 4 and restrained from axial movement therein, the screw engaging a nut 34 fixed with sleeve 32 and being provided with a squared portion 35 for reception of a crank, or the like, for rotating.

In order to be able to adjust spindles 5 and 6 very close together, spindle 5 is located relatively low down in carrier 3 and conversely spindle 6 and sleeve 32 are located as high up as possible in carrier 4. A slot 36, Figs. 2 and 9, formed in carrier 4 facilitates this location somewhat and also allows the carrier to be slightly compressed from deflection of head frame 2 under the influence of bolts 30—31. Clamping the carrier by means of these bolts accordingly also clamps the sleeve within the carrier.

Table 9 may be moved when desired by rotation of a screw 37, Fig. 8, journaled in suitable bearings 38 and 39 (see also Fig. 1) fixed with the table and engaging a nut 40 fixed with a portion of bed 1. The screw may be rotated by means of a suitable crank applied to a squared portion 41 of the screw or by power, as will be presently apparent.

The various power trains of the machine originate in a power source, in the present instance consisting of a pulley 42, Fig. 1, driving, through a clutch generally denoted by numeral 43, a shaft 44. Shaft 44 drives a shaft 45 through gears 46 and 47 meshed together and fixed with the respective shafts, shaft 45 driving a vertical shaft 48 through bevel gears 49 and 50. Bevel gear 49 has an elongated hub portion 51 journaled in a bracket 52 depending from head frame 2 through a suitable slot in bed 1, the gear being slidably keyed with shaft 45 whereby it may slide thereon during adjustment of head frame 2 with relation to bed 1. Shaft 48 drives, through a rate changer generally denoted by numeral 53, a shaft 54 which in turn drives a shaft 55 through gears 56 and 57, gear 56 being fixed with shaft 54 and gear 57 being slidably keyed on shaft 55. Shaft 55 is movable with spindle carrier 3 during adjustment thereof and drives spindles 5 and 6 through mechanism which will be described in detail presently.

Shaft 44 drives table 9 through a rate changer generally denoted by numeral 58, driving a shaft 59 having fixed thereon a worm 60 engaging a worm wheel 61. Worm wheel 61 is fixed with a gear 62, Fig. 8, journaled on a stud 63 fixed with bed 1 and gear 62 drives, through a reverser generally denoted by numeral 64, a sleeve 65 suitably journaled in bed 1 and slidably keyed with above mentioned screw 37. Rotation of shaft 44 may accordingly cause rotation of the screw and translation of the table in a direction determined by reverser 64.

Clutch 43, as shown in Fig. 1, comprises an outer member 66 fixed with a sleeve 67 journaled in a suitable bearing in bed 1 and on which is fixed pulley 42, shaft 44 being journaled in the sleeve which forms a pilot bearing therefor. An inner member 68 of clutch 43 is slidably keyed on shaft 44 and may be moved into and out of engagement with member 66 by means of a hand lever 69 fixed with a shaft 70 journaled in the bed and having a lever 71 fixed therewith for actuation of a lever 72 pivoted on a stud 73 through the medium of a link 74 pivoted to the respective levers. Lever 72 has a forked end portion carrying pivoted shoes such as 75 engaging an annular groove 76 in member 68 whereby movement of lever 69 up or down will cause movement of member 68 into or out of engagement with member 66.

Rate changer 58 is enclosed in a removable housing 77 and comprises a gear 78 removably keyed with shaft 44 and driving a gear 79 removably keyed with a sleeve 80, as shown in Fig. 8, the sleeve having also removably keyed therewith a gear 81 meshing with a gear 82 removably keyed with shaft 59. The various gears may be removed and interchanged or replaced by others of different ratios to give various desired speeds in shaft 59 and accordingly in the travel of table 9.

Reverser 64 comprises gears 83 and 84 spaced apart on a stud 85 fixed with bed 1 and having suitable clutch teeth for alternative engagement with a clutch gear 86 journaled on the stud and driven from above mentioned gear 62, a sleeve 87 being interposed between stud 85 and a portion of bed 1 for facilitating assembly. Gear 83 is meshed with and drives a gear 88, gear 88 being fixed with a sleeve 89 keyed with above mentioned sleeve 65, and gear 84 drives, through an idler 90 shown displaced from its normal position in Fig. 8, a gear 91 also fixed with sleeve 89. Engagement of clutch gear 86 with gear 83 accordingly drives gear 88 and, through sleeves 89 and 65, screw 37 in one direction, while clutch gear 86 through engagement with gear 84 drives, through gear 84 and idler 90, gear 91 and screw 37 in the opposite direction.

A hand lever 92, Fig. 1, is provided for shifting clutch gear 86, the lever being fixed on the shaft 93 journaled in the bed and carrying a crank 94 having a pin 95 engaging a slot 96 in a shoe 97 slidable on a rod 98 and engaging the sides of clutch gear 86. Accordingly movement of lever 92 in one or the other direction will cause sliding movement of shoe 97 and movement of clutch gear 86 into a desired position.

For automatic movement of shoe 97 trip plungers such as 98 may be provided slidable in bed 1 and engaging a gear 99 fixed with shaft 93 through suitable rack teeth formed on the plungers. The plungers may be operated from suitable devices associated with table 9, such as dog 100 fixed with the table by means of a suitable bolt engaging a T-slot 101.

Rate changer 53 is contained in a housing 102 having a removable closure 103 and comprises gears 104 and 105 meshed together and removably keyed with shafts 48 and 54 respectively. The gears may be removed and interchanged or replaced with others of different ratio also interchangeable for producing various desired speeds in spindles 5 and 6.

The transmission to the two spindles is as follows: Shaft 55 drives a shaft 106, Figs. 2 and 3, through gears 107 and 108 meshed together and fixed with the respective shafts, and shaft 106 drives a horizontal shaft 109 through bevel gears 110 and 111, the gears being shown separated in Fig. 3, this figure being developed somewhat as above noted. The gears actually mesh as shown in Figs. 1 and 2. Shaft 109 drives spindles 5 through a gear 112 fixed with the shaft and meshing with a gear 113 fixed with the spindle.

Shaft 106 also drives a shaft 114 through bevel gears 115 and 116 meshed together, a gear 115 being slidably keyed with shaft 106 and journaled in spindle carrier 4 whereby the shaft may slide in the gear during movement of either spindle carrier, and gear 116 being fixed with shaft 114. Shaft 114 has a wide faced gear 117 fixed therewith and meshing with a gear 118 fixed with spindle 6, the wide face of gear 117 permitting longitudinal adjustment of spindle 6 while maintaining the driving relation between gears 117 and 118. The two spindles may accordingly be power driven in the various positions of the spindle carriers and spindle 6 may be so driven in its various axially adjusted positions.

It will be seen that, lacking preventive means, openings will occur, one beneath spindle carrier 4 and another between the two spindle carriers into which foreign matter such as chips, dust, coolant, and the like will easily find its way. In the present machine these openings are closed as follows: Carrier 4 has a plate 119, Figs. 4 and 7, fixed therewith and depending therefrom to close the opening beneath the carrier, the plate sliding with movements of the carrier in guiding members 120 and 121 fixed with head frame 2.

A second plate 122 is slidable in guides 120 and 121 and is connected by means of pins 123 and 124 fixed in plate 122 and engaging slots 125 and 126 respectively. The slots are of a depth extending only part way through plate 119 and their length is such as to cause plate 122 to move after movement of plate 119 in order to close any opening which might appear below plate 119 in the event of movement of carrier 4 and plate 119 upwardly through a distance greater than the width of the plate.

A third plate 127 is also guided for movement after plate 122, having pins 128 and 129 engaging slots 130 and 131 respectively in plate 122. Accordingly the three plates will overlap at all times to close any opening which would otherwise exist beneath spindle carrier 4.

For closing the opening between the spindle carriers a plate 132 is fixed with spindle carrier 3 extending downwardly over the opening and of such dimensions as to overlap carrier 4 in the various adjusted positions of the carriers. In order to provide freedom of movement of carrier 4 relative to carrier 3, it is necessary to provide an opening 133 in plate 132 for movement of spindle 6 and sleeve 32, and a closure for this opening is provided in the form of a plate 134. The plate is disposed between plates 132 and 119 and journaled on sleeve 32. It has a periphery in the form of a variable curve and is connected to rotate upon movement of either carrier so as to cover opening 133 at all times but not to contact spindle 5.

Gearing for so rotating plate 134 comprises a rack 135 fixed with carrier 3, Figs. 4 and 6, and extending downwardly into a suitable recess or groove in carrier 4 behind plate 119, the rack engaging a gear 136 journaled on a stud 137. Gear 136 has fixed therewith a gear 138 which engages a ring gear 139 journaled on sleeve 32 and fixed with plate 134. Movement of either spindle carrier relative to the other will accordingly cause rotation of plate 134, and the contour thereof is such that such rotation will keep opening 133 closed during such movements and in the various adjusted positions of said carriers.

The above being a full and complete description of an illustrative embodiment of the invention, what is claimed is:

1. In a machine tool, the combination of a support providing a wall, a rotative spindle projecting through said wall and supported for bodily movement in a direction transverse to its axis, said wall having an opening disposed to permit such movement, means for said bodily spindle movement, means including a pivoted member adapted to close said opening in various positions of said spindle and during movement thereof, and a motion transmitting connection from said spindle moving means to said pivoted member.

2. In a machine tool, the combination of a support providing a wall, a rotative spindle projecting through said wall and supported for bodily movement in a direction transverse to its axis of rotation, said wall having an opening disposed to permit such movement, a closure for said opening during movement of said spindle and in various positions thereof including a slidably guided plate and a pivoted member, means for said bodily spindle movement, and means operable in accordance with the bodily movement of said spindle for rotating said closure member and sliding said plate relative to said spindle during said bodily movement of said spindle.

3. In a milling machine, the combination of a base, a work support reciprocably supported from said base, a head frame uprising from said base at one side of the path of travel of said work support, a first spindle carrier supported from said head frame, a first spindle rotatively supported from said spindle carrier and axially transverse to the path of travel of said work support, a second spindle carrier supported from said head frame, a second spindle rotatively supported from said second spindle carrier and axially transverse to the path of travel of said work support, one of said spindle carriers being bodily movable with respect to the other in a direction transverse to the axis of one of said spindles whereby to space said carriers apart, a closure associated with said spindle carriers and adapted to close said space between said carriers and including a pivoted member, means for movement of said movable carrier, and a motion transmitting connection from said carrier moving means to rotate said pivoted member.

4. In a milling machine, the combination of a base, a work support reciprocably supported from said base, a head frame uprising from said base at one side of the path of travel of said work support, a first spindle carrier supported from said head frame, a first spindle rotatively supported from said spindle carrier and axially transverse to the path of travel of said work support, a second spindle carrier supported from said head frame, a second spindle rotatively supported from said second spindle carrier and axially transverse to the path of travel of said work support, one of said spindle carriers being bodily movable with respect to the other in a direction transverse to the axis of one of said spindles whereby to space said carriers apart, closing means for said space associated with said spindle carriers including a slidably guided plate and a pivoted member, means for said bodily spindle movement, and means for relative movement of said plate and member in accordance with the operation of said spindle moving means.

5. In a milling machine, the combination of a base, a work support reciprocably supported from said base, a head frame uprising from said base at one side of the path of travel of said work support, a first spindle carrier supported from said head frame, a first spindle rotatively supported from said spindle carrier and axially transverse to the path of travel of said work support, a second spindle carrier supported from said head frame, a second spindle rotatively supported from said second spindle carrier and axially transverse to the path of travel of said work support, one of said spindle carriers being bodily movable with respect to the other in a direction transverse to the axis of one of said spindles whereby to form an opening between said carriers, a closure for said opening associated with said spindle carriers and including a pivoted plate, and means for movement of said plate about its pivot including gearing adapted for actuation from movement of said bodily movable spindle carrier.

6. In a milling machine, the combination of a base, a work table reciprocably supported from said base, a head frame uprising from said base at one side of the path of travel of said work support, an upper spindle carrier supported for vertical adjustment in said head frame, an upper tool spindle horizontally rotatably supported from said upper spindle carrier axially transverse to the path of travel of said work table, a lower spindle carrier supported for vertical adjustment in said head frame underneath said upper carrier, a lower tool spindle horizontally rotatably supported from said lower spindle carrier axially transverse to the path of movement of said work table, said head frame providing an opening in the direction of said table for said movement of said carriers, means for closing a portion of said opening underneath said lower spindle carrier including a plurality of relatively slidable plates, one of said plates being fixed with said head frame and another being movable with said lower spindle carrier, a closure member fixed with said upper spindle carrier and providing a slotted opening through which said lower spindle projects, and closing means associated with said slotted opening including a member pivoted on said lower spindle carrier, and connections for rotation of said pivoted member from movement of one spindle carrier relative to the other.

7. In a machine tool, the combination of a support providing a wall, a rotative spindle projecting through said wall and supported for bodily movement in a direction transverse to its axis of rotation, said wall having an opening disposed to permit such movement, a closure for said opening during movement of said spindle and in various positions thereof including a pivoted member, means for said bodily spindle movement, and means operable for rotating said closure member in amounts predetermined with relation to the bodily movements of said spindle.

8. In a milling machine, the combination of a base, a work support reciprocably supported from said base, a head frame uprising from said base at one side of the path of travel of said work support, a first spindle carrier supported from said head frame, a first spindle rotatively supported from said spindle carrier and axially transverse to the path of travel of said work support, a second spindle carrier supported from said head frame, a second spindle rotatively supported from said second spindle carrier and axially transverse to the path of travel of said work support, one of said spindle carriers being bodily movable with respect to the other in a direction transverse to the axis of one of said spindles whereby to space said carriers apart, a closure associated with said spindle carriers and adapted to close said space between said carriers and including a pivoted member, means for movement of said movable carrier, and a motion transmitting connection from said carrier moving means to rotate said pivoted member in amounts predetermined with relation to the bodily movements of said carrier.

In witness whereof I have hereto affixed my signature.

EDWARD J. KEARNEY.